(12) United States Patent
Brown

(10) Patent No.: US 6,954,054 B2
(45) Date of Patent: Oct. 11, 2005

(54) TOTAL FEED FORWARD SWITCHING POWER SUPPLY CONTROL

(75) Inventor: James Steven Brown, San Pedro, CA (US)

(73) Assignee: International Business Machines Corporation, El Segundo, CA (US)

(*) Notice: Subject to any disclaimer, the term of this patent is extended or adjusted under 35 U.S.C. 154(b) by 0 days.

(21) Appl. No.: 10/956,978

(22) Filed: Oct. 1, 2004

(65) Prior Publication Data

US 2005/0083025 A1 Apr. 21, 2005

Related U.S. Application Data

(60) Provisional application No. 60/515,325, filed on Oct. 29, 2003, and provisional application No. 60/512,349, filed on Oct. 17, 2003.

(51) Int. Cl.[7] ................................................. G05F 1/56
(52) U.S. Cl. .................... 323/283; 323/285; 323/299; 323/351
(58) Field of Search ............................... 323/283, 285, 323/299, 351

(56) References Cited

U.S. PATENT DOCUMENTS

| | | | | |
|---|---|---|---|---|
| 5,272,614 A | * | 12/1993 | Brunk et al. | 363/21.05 |
| 5,475,296 A | * | 12/1995 | Vinsant et al. | 323/223 |
| 5,696,439 A | * | 12/1997 | Presti et al. | 323/283 |
| 5,969,515 A | * | 10/1999 | Oglesbee | 323/283 |
| 6,005,377 A | * | 12/1999 | Chen et al. | 323/283 |
| 6,020,729 A | * | 2/2000 | Stratakos et al. | 323/283 |
| 6,031,361 A | * | 2/2000 | Burstein et al. | 323/224 |
| 6,194,883 B1 | * | 2/2001 | Shimamori | 323/283 |
| 6,400,127 B1 | * | 6/2002 | Giannopoulos | 323/283 |
| 6,771,052 B2 | * | 8/2004 | Ostojic | 323/266 |

* cited by examiner

Primary Examiner—Jeffrey Sterrett
(74) Attorney, Agent, or Firm—Ostrolenk, Faber, Gerb & Soffen, LLP

(57) ABSTRACT

A power supply comprising a switching converter capable of being controlled by a control signal to provide a desired output from a DC input voltage, an analog to digital converter receiving as analog inputs a gate drive voltage of at least one switch of the switching converter, a temperature related measurement of the switching converter, the DC input voltage and an output current of the switching converter and converting the analog inputs to digital input signals, a digital processor receiving the digital input signals and generating the control signal to drive at least one switch of the switching converter to drive the output of the switching converter to the desired output and a memory storing data relating the digital input signals to the desired output of the switching converter and providing to the digital processor a memory output signal to enable the processor to generate the control signal to drive the at least one switch to provide the desired output from the switching converter.

35 Claims, 2 Drawing Sheets

TOTAL FEED FORWARD SWITCHING POWER SUPPLY CONTROL

CROSS REFERENCE TO RELATED APPLICATIONS

Figure 1:
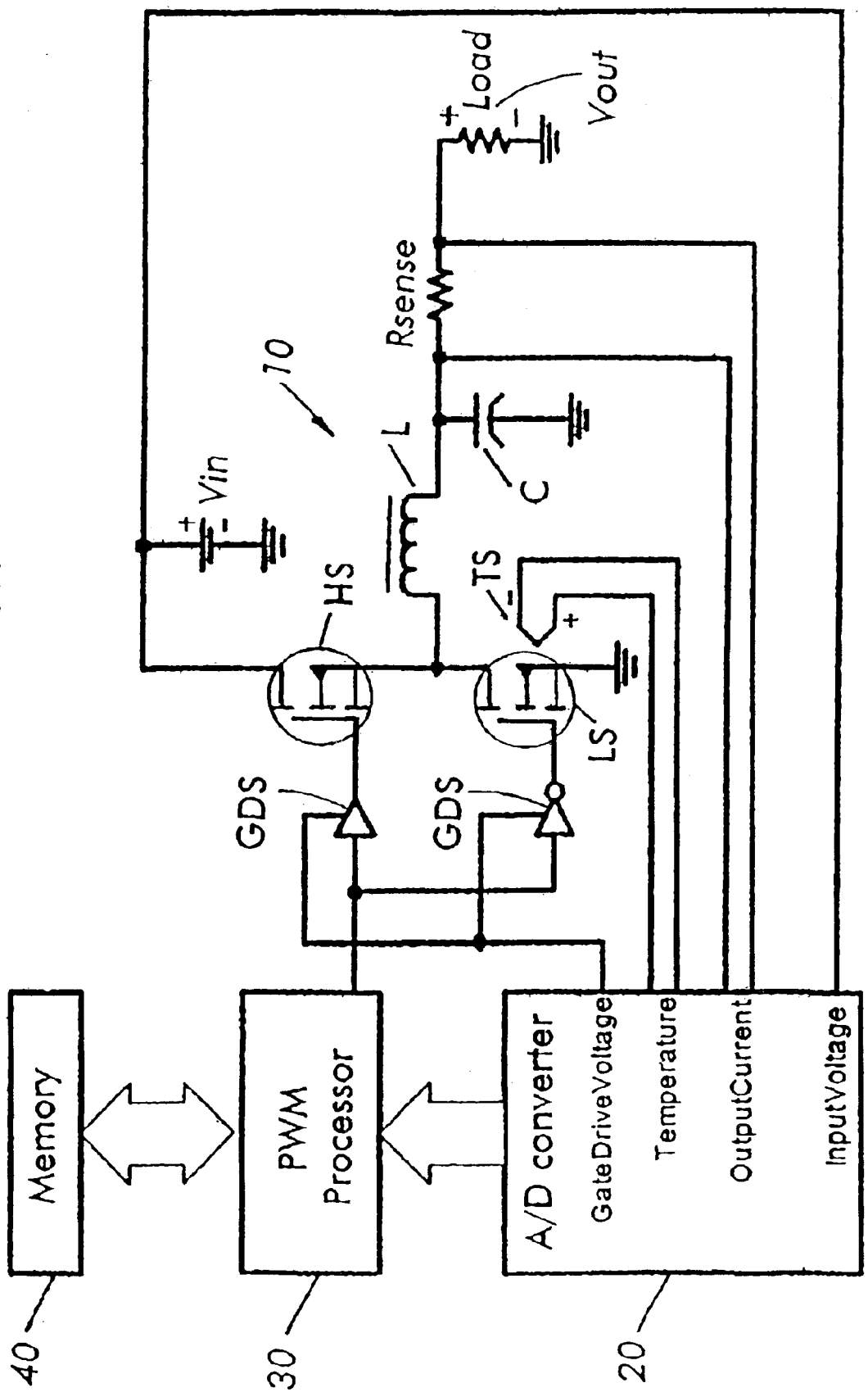

This application claims the priority and benefit of U.S. Provisional Application Ser. No. 60/515,325, filed Oct. 29, 2003 entitled TOTAL FEED FORWARD SWITCHING POWER SUPPLY CONTROL and U.S. Provisional Application Ser. No. 60/512,349 filed Oct. 17, 2003 entitled TOTAL FEED FORWARD SWITCHING POWER SUPPLY CONTROL, the entire disclosures of each of which are incorporated by reference herein.

BACKGROUND OF THE INVENTION

Traditional switching power supplies use feedback compared to an internal reference in order to control the output to within a specified range. From a DC standpoint this is ideal since the output is actually controlled to the desired accuracy. From an AC/transient standpoint this is less than ideal because of the finite time required to respond to an "input" change.

In this case "input" refers to any one of the factors that can affect output voltage of the power supply, including:

Input voltage;
Power switch drive voltage;
Output current;
Power supply temperature;
Power supply frequency.

Input voltage and output current can change very rapidly. Traditional output voltage feedback has no way of detecting that change until it has already resulted in a change in output voltage. Additionally, due to hardware limitations and stability criteria the control system cannot respond instantly to a change in output voltage.

The net result is a compromise between fast response and unconditional stability. Often this is adequate, but in some cases a feed forward element must be incorporated to achieve desired performance. An example of this is in current mode control which has inherent input voltage feed forward. This is especially helpful in applications that may rapidly switch from one input source to another, such as a notebook computer.

Another situation in which feedback is less than optimum is in high output load transient situations such as those encountered in high performance microprocessor power supplies. Until now there has been no satisfactory feed forward methodology developed to deal with this problem so practical solutions focus on minimizing the time it takes the power supply to respond to a change in output voltage.

SUMMARY OF THE INVENTION

If the transfer function of a power supply relative to its several inputs can be accurately mapped, it is possible to set the duty factor of the power supply according to the values of these inputs and achieve accurate control of output voltage.

The output of the supply must be mapped and "remembered" over the full range of input conditions. This mapping can consist of a memory of the discrete points of operation, or it can rely on a memory of the mathematical transfer function of each input, or a combination of the two.

In theory it is not even necessary to monitor output voltage, but there are several potential benefits of doing so, such as fault detection.

While this total feed forward approach is entirely possible with analog circuitry, it is largely impractical due to the necessary complexity and cost. It is accordingly an object of the present invention to provide a digital implementation of a total feed forward control, but the concepts could be applied to analog counterparts.

The objects of the invention are achieved by a power supply comprising a switching converter capable of being controlled by a control signal to provide a desired output from a DC input voltage, an analog to digital converter receiving as analog inputs a gate drive voltage of at least one switch of the switching converter, a temperature related measurement of the switching converter, the DC input voltage and an output current of the switching converter and converting the analog inputs to digital input signals, a digital processor receiving the digital input signals and generating the control signal to drive at least one switch of the switching converter to drive the output of the switching converter to the desired output; and a memory storing digital data relating the digital input signals to a desired output of the switching converter and providing to the digital processor a memory output signal to enable the processor to generate the control signal to drive the at least one switch to provide the desired output from the switching converter.

The objects are also achieved by a power supply comprising a switching converter capable of being controlled by a control signal to provide a desired output from a DC input voltage, a processor receiving at least one input signal comprising one or more of the following: a gate drive voltage of at least one switch of the switching converter; a temperature related measurement of the switching converter; the DC input voltage; and an output current of the switching converter; the processor generating the control signal to drive at least one switch of the switching converter to drive the output of the switching converter to the desired output; and an input/output correlator relating the at least one input signal to a desired output of the switching converter and providing to the processor an output signal to enable the processor to generate the control signal to drive the at least one switch to provide the desired output from the switching converter.

The objects of the invention are furthermore achieved by a method of controlling the output of a switching converter capable of being controlled by a control signal to provide a desired output from a DC input voltage, the method comprising receiving as inputs a gate drive voltage of at least one switch of the switching converter, a temperature related measurement of the switching converter, the DC input voltage and an output current of the switching converter; performing a correlation correlating the inputs to a desired output of the switching converter and providing to a processor information from the correlation to enable the processor to generate a control signal to drive at least one switch of the switching converter so as to provide the desired output from the switching converter.

Other features and advantages of the present invention will become apparent from the following description of the invention which refers to the accompanying drawings.

BRIEF DESCRIPTION OF THE DRAWING(S)

Figure 1A:
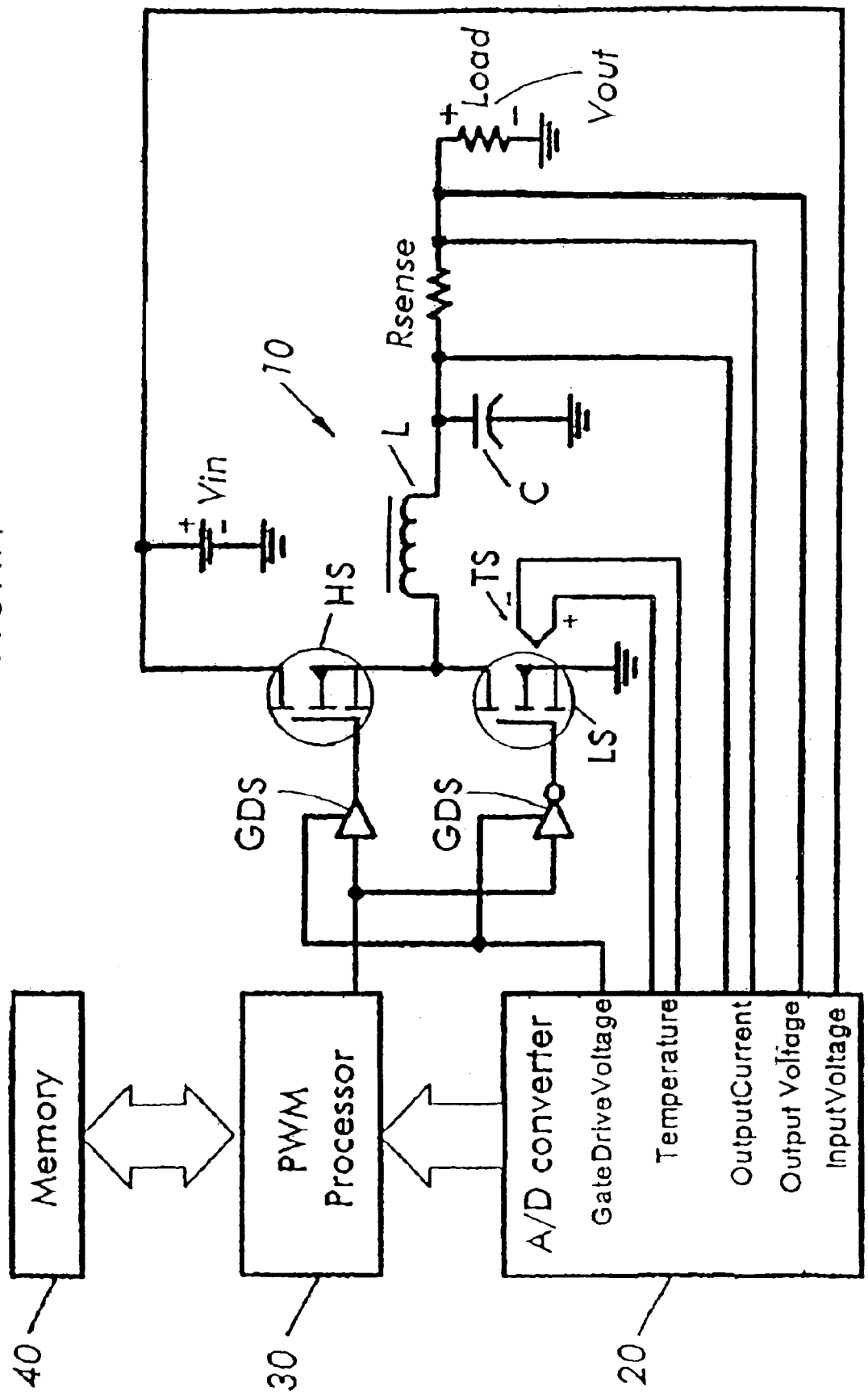

The invention will now be described in greater detail in the following detailed description, with reference to the drawing in which:

FIG. 1 is a block diagram of the circuit of the invention.
FIG. 1A is a block diagram of an alternative circuit.

DETAILED DESCRIPTION OF PREFERRED EMBODIMENTS

By employing digital control in the form of a microcontroller, microprocessor, DSP (Digital Signal Processor), logic state machine or other digital implementation (processor), combined with mixed signal circuitry for acquisition of inputs, it is possible to achieve a practical implementation of this technique.

With reference now to FIG. 1, the power supply converter 10 can be any switching power supply topology, e.g., buck, boost, buck/boost, flyback, etc. A buck converter topology is shown including high side (HS) and low side (LS) switches, output inductor L and output capacitor C. The DC bus is indicated by voltage Vin. This control method is theoretically valid for any topology, but will be most effective when employed in synchronous rectification topologies in which the output is not a function of storage inductance value under light load. Gate drive voltage sensors (GDS) are provided for sensing the gate drive voltages of the switches. A temperature sensor (TS) may be provided for one or both switches, although for the buck converter shown, such sensing can be adequately obtained by providing a single sensor TS on the low side device LS.

A/D converters 20 are provided for all voltage or currents inputs. These may include input voltage, gate drive voltage, output current, and power supply temperature, as shown. Output current may be sensed across a resistor Rsense, FET switch $R_{DSON}$, inductor resistance, current transformer or any suitable means. Since operating frequency is under control of the processor 30, it is a given and does not have to be measured. A correlator device, e.g., memory 40, which stores the supply output response to each of those inputs either directly via a multi-dimensional lookup table, or through a multi-input mathematical function which models the response, is coupled to processor 30. Depending on the accuracy required, this could be a memory of either typical family performance, or of individual supply performance during a calibration at startup, or a memory of actual history of the individual supply during normal operation. It is also desirable, but not necessary, to measure output voltage to facilitate fault detection. This is shown in FIG. 1A. Also, output voltage sensing may be used to continuously update the multi-input transfer function or multi-dimensional lookup table of the supply in order to compensate for aging effects or so that the power supply can "teach itself" or adapt to the appropriate duty factor for pulse width modulation or transfer function for various inputs. The PWM processor, 30 has intelligence to process the inputs in view of the stored response and choose an appropriate duty factor for the pulse width modulation (PWM) of the switches HS and LS.

It is necessary for the designer to characterize the transfer function of the power supply as a function of its various inputs. This can be done empirically, or theoretically, depending on how accurate these estimates need to be. A combination of the two may be desirable since a statistically valid sample of performance may not be practically obtainable at design time.

Depending on how the supply will be used, this design time characterization may be all that is required for the life of the supply. If greater accuracy is required some further calibration will be required. If run time calibration will be employed, the design time accuracy need only be good enough to ensure predictable operation at initial power-up.

Run time calibration may not be required for all applications. When it is, it can be done in several ways, for example:

Using external instrumentation, intelligence, and communication to characterize and "program" the power supply on initial power up while applying a range of input forcing functions;

Using the instrumentation and intelligence of the power supply to characterize itself while applying a range of input forcing functions;

Combining either of the above with ongoing and periodic re-calibration using internal instrumentation and intelligence.

In any case, an external device will be required to provide the varying forcing functions.

The invention has several advantages including the following:

Virtual instant load and line transient response. The time necessary to respond is roughly equal to the time to acquire the changed input. Unlike traditional feedback control schemes, the duty factor will be changed to the new final value as soon as the new input is processed.

Unconditional stability. With traditional feedback schemes it is necessary to maintain adequate phase margin over the useable feedback frequency range in order to prevent regeneration and subsequent instability. This requires tailoring the frequency response of the feedback, which typically results in slowing the response of the supply, as described above. Since there is no "feedback" in the traditional sense, traditional stability is a non-issue. New input information can be processed without delay.

Simplification of digital power supply control schemes. Since traditional feedback is not required, computationally intensive digital filtering schemes do not need to be implemented. This reduces the processing power/speed required for digital control.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. A power supply comprising:
    a switching converter capable of being controlled by a control signal to provide a desired output from a DC input voltage;
    an analog to digital converter receiving as analog inputs a gate drive voltage of at least one switch of the switching converter, a temperature related measurement of the switching converter, the DC input voltage and an output current of the switching converter and converting the analog inputs to digital input signals;
    a digital processor receiving the digital input signals and generating the control signal to drive at least one switch of the switching converter to drive the output of the switching converter to the desired output; and
    a memory storing digital data relating the digital input signals to a desired output of the switching converter and providing to the digital processor a memory output signal to enable the processor to generate the control signal to drive the at least one switch to provide the desired output from the switching converter.

2. The power supply of claim 1, wherein the memory has stored therein digital data comprising a multi dimensional look-up table correlating the digital input signals to the memory output signal to be provided to the processor to enable the processor to generate the control signal to drive the at least one switch of the switching converter to provide the desired output from the switching converter.

3. The power supply of claim 1, wherein the memory has stored therein digital data comprising a mathematical function that models the desired output of the switching converter to the digital input signals such that the mathematical function provides the memory output signal to the processor in response to the digital input signals whereby the processor generates the control signal to drive the at least one switch of the switching converter to provide the desired output from the switching converter.

4. The power supply of claim 1, wherein the memory has stored therein:
   digital data comprising a multi dimensional look-up table correlating the digital input signals to the memory output signal to be provided to the processor; and
   digital data comprising a mathematical function that models the desired output of the switching converter to the digital input signals such that the mathematical function provides the memory output signal to the processor in response to the digital input signals;
   whereby the processor generates the control signal to drive the at least one switch of the switching converter to provide the desired output from the switching converter based on one or both the multidimensional look-up table or the mathematical function.

5. The power supply of claim 1, wherein the control signal is a PWM signal.

6. The power supply of claim 1, wherein the digital processor receives the digital input signals on a periodic basis and provides the control signal to the switching converter on a periodic basis.

7. The power supply of claim 1, further comprising a sensor for sensing each of said analog inputs coupled to the switching converter.

8. The power supply of claim 7, further comprising a sensor for sensing the output voltage of the converter.

9. The power supply of claim 8, further comprising an analog to digital converter for converting the output voltage to a digital input signal for provision to the processor.

10. The power supply of claim 9, wherein the output voltage is used to provide fault protection or to compensate for aging effects of the power supply.

11. The power supply of claim 10, wherein the output voltage is used to update the digital data in the memory to compensate for aging effects of the power supply or so that the power supply can teach itself the appropriate duty factor for pulse width modulation or transfer function for various inputs.

12. The power supply of claim 1, wherein the processor comprises one of a microcontroller, microprocessor or logic state machine.

13. A power supply comprising:
   a switching converter capable of being controlled by a control signal to provide a desired output from a DC input voltage;
   a processor receiving at least one input signal comprising one or more of the following:
   a gate drive voltage of at least one switch of the switching converter;
   a temperature related measurement of the switching converter;
   the DC input voltage; and
   an output current of the switching converter;
   the processor generating the control signal to drive at least one switch of the switching converter to drive the output of the switching converter to the desired output, and
   an input/output correlator relating the at least one input signal to a desired output of the switching converter and providing to the processor an output signal to enable the processor to generate the control signal to drive the at least one switch to provide the desired output from the switching converter,
   further wherein the input/output correlator has stored therein:
   data comprising a multi dimensional look-up table correlating the input signals to the correlator output signal to be provided to the processor; and
   data comprising a mathematical function that models the desired output of the switching converter to the input signals such that the mathematical function provides the output signal to the processor in response to the input signals;
   whereby the processor generates the control signal to drive the at least one switch of the switching converter to provide the desired output from the switching converter based on one or both the multidimensional look-up table or the mathematical function.

14. A power supply comprising:
   a switching converter capable of being controlled by a control signal to provide a desired output from a DC input voltage;
   a processor receiving at least one input signal comprising one or more of the following:
   a gate drive voltage of at least one switch of the switching converter;
   a temperature related measurement of the switching converter;
   the DC input voltage; and
   an output current of the switching converter;
   the processor generating the control signal to drive at least one switch of the switching converter to drive the output of the switching converter to the desired output, and
   an input/output correlator relating the at least one input signal to a desired output of the switching converter and providing to the processor an output signal to enable the processor to generate the control signal to drive the at least one switch to provide the desired output from the switching converter,
   further wherein the input/output correlator comprises a memory having stored therein data comprising a multi dimensional look-up table correlating the at least one input signal to a memory output signal to be provided to the processor to enable the processor to generate the control signal to drive the at least one switch of the switching converter to provide the desired output from the switching converter.

15. A power supply comprising:
   a switching converter capable of being controlled by a control signal to provide a desired output from a DC input voltage;
   a processor receiving at least one input signal comprising one or more of the following:
   a gate drive voltage of at least one switch of the switching converter;
   a temperature related measurement of the switching converter;
   the DC input voltage; and
   an output current of the switching converter;
   the processor generating the control signal to drive at least one switch of the switching converter to drive the output of the switching converter to the desired output, and an input/output correlator relating the at least one input signal to a desired output of the switching converter and providing to the processor an output signal to enable the processor to generate the control signal to drive the at least one switch to provide the desired output from the switching converter.

further wherein the input/output correlator comprises a memory having stored therein data comprising a mathematical function that models the desired output of the switching converter to the at least one input signal such that the mathematical function provides a memory output signal to the processor in response to the at least one input signal whereby the processor generates the control signal to drive the at least one switch of the switching converter to provide the desired output from the switching converter.

16. A power supply comprising:

a switching converter capable of being controlled by a control signal to provide a desired output from a DC input voltage;

a processor receiving at least one input signal comprising one or more of the following:

a gate drive voltage of at least one switch of the switching converter;

a temperature related measurement of the switching converter;

the DC input voltage; and an output current of the switching converter;

the processor generating the control signal to drive at least one switch of the switching converter to drive the output of the switching converter to the desired output, and an input/output correlator relating the at least one input signal to a desired output of the switching converter and providing to the processor an output signal to enable the processor to generate the control signal to drive the at least one switch to provide the desired output from the switching converter, the input/output correlator comprising either of:

a) a memory having stored therein data comprising a multi dimensional look-up table correlating the at least one input signal to a memory output signal to be provided to the processor to enable the processor to generate the control signal to drive the at least one switch of the switching converter to provide the desired output from the switching converter; or b) a memory having stored therein data comprising a mathematical function that models the desired output of the switching converter to the at least one input signal such that the mathematical function provides a memory output signal to the processor in response to the at least one input signal whereby the processor generates the control signal to drive the at least one switch of the switching converter to provide the desired output from the switching converter.

17. The power supply of claim 16, wherein the control signal is a PWM signal.

18. The power supply of claim 16, wherein the processor receives the at least one input signal on a periodic basis and provides the control signal to the switching converter on a periodic basis.

19. The power supply of claim 16, further comprising a sensor for sensing said at least one input coupled to the switching converter.

20. The power supply of claim 19, further comprising a sensor for sensing the output voltage of the converter.

21. The power supply of claim 20, wherein the output voltage is used to provide fault protection or to compensate for aging effects of the power supply.

22. The power supply of claim 21, wherein the output voltage is used to update the data in the input/output correlator to compensate for aging effects of the power supply or so that the power supply can teach itself the appropriate duty factor for pulse width modulation or transfer function for various inputs.

23. The power supply of claim 16, wherein the processor comprises one of a microcontroller, microprocessor, DSP or logic state machine.

24. A method of controlling the output of a switching converter capable of being controlled by a control signal to provide a desired output from a DC input voltage, the method comprising:

receiving as inputs a gate drive voltage of at least one switch of the switching converter, a temperature related measurement of the switching converter, the DC input voltage and an output current of the switching converter;

performing a correlation correlating the inputs to a desired output of the switching converter; and providing to a processor information from the correlation to enable the processor to generate a control signal to drive at least one switch of the switching converter so as to provide the desired output from the switching converter.

25. The method of claim 24, further comprising receiving the inputs as analog signals, converting the inputs to digital input signals and supplying the digital input signals to the processor.

26. The method of claim 25, wherein the step of correlating the inputs to a desired output of the switching converter comprises storing digital data comprising a multi dimensional look-up table in a memory correlating the digital input signals to a memory output signal to be provided to the processor to enable the processor to generate the control signal to drive the at least one switch of the switching converter to provide the desired output from the switching converter.

27. The method of claim 25, wherein the step of correlating the inputs to a desired output of the switching converter comprises storing a mathematical function that models the desired output of the switching converter to the input signals such that the mathematical function provides an output signal to the processor in response to the input signals whereby the processor generates the control signal to drive the at least one switch of the switching converter to provide the desired output from the switching converter.

28. The method of claim 25, wherein the step of correlating the inputs to a desired output of the switching converter comprises:

storing digital data comprising a multi dimensional look-up table in a memory correlating the digital input signals to a memory output signal to be provided to the processor; and storing a mathematical function that models the desired output of the switching converter to the input signals such that the mathematical function provides an output signal to the processor in response to the input signals;

whereby the processor generates the control signal to drive the at least one switch of the switching converter to provide the desired output from the switching converter based on one or both the mathematical look-up table or the mathematical function.

29. The method of claim 24, wherein the control signal is a PWM signal.

30. The method of claim 24, further comprising receiving the inputs on a periodic basis and providing the control signal to the switching converter on a periodic basis.

31. The method of claim 24, further comprising sensing each of said inputs with a sensor coupled to the switching converter.

32. The method of claim 31, further comprising sensing the output voltage of the converter.

33. The method of claim 32, further comprising converting the output voltage to a digital signal for provision to the processor.

34. The method of claim 33, further comprising using the output voltage to provide fault protection or to compensate for aging effects of the power supply.

35. The method of claim 34, further comprising using the output voltage in the step of correlating the inputs to the desired output of the switching converter to compensate for aging effects of the power supply or so that the power supply can teach itself the appropriate duty factor for pulse width modulation or transfer function for various inputs.

* * * * *

UNITED STATES PATENT AND TRADEMARK OFFICE
CERTIFICATE OF CORRECTION

PATENT NO. : 6,954,054 B2 Page 1 of 1
DATED : October 11, 2005
INVENTOR(S) : James Steven Brown It is certified that error appears in the above-identified patent and that said Letters Patent is hereby corrected as shown below:

<u>Title page,</u>
Item [73], Assignee, change to -- International Rectifier Corporation, El Segundo, CA (US) --.

Signed and Sealed this

Third Day of January, 2006

JON W. DUDAS
*Director of the United States Patent and Trademark Office*